US007818456B2

(12) United States Patent
Carro

(10) Patent No.: US 7,818,456 B2
(45) Date of Patent: Oct. 19, 2010

(54) METHOD AND SYSTEM FOR PROCESSING A FILE ATTACHED TO AN ELECTRONIC DOCUMENT

(75) Inventor: Fernando Incertis Carro, Valencia (ES)

(73) Assignee: International Business Machines Corporation, Armonk, NY (US)

( * ) Notice: Subject to any disclaimer, the term of this patent is extended or adjusted under 35 U.S.C. 154(b) by 1455 days.

(21) Appl. No.: 11/159,912

(22) Filed: Jun. 23, 2005

(65) Prior Publication Data

US 2005/0289149 A1    Dec. 29, 2005

(51) Int. Cl.
*G06F 15/16*    (2006.01)
(52) U.S. Cl. ............... 709/246; 707/1; 707/E17.002; 709/200
(58) Field of Classification Search ............. 709/246, 709/206, 200
See application file for complete search history.

(56) References Cited

U.S. PATENT DOCUMENTS

| 5,903,723 | A  |   | 5/1999  | Beck et al. |
|---|---|---|---|---|
| 6,275,848 | B1 |   | 8/2001  | Arnold |
| 6,505,236 | B1 | * | 1/2003  | Pollack ................ 709/206 |
| 7,308,084 | B2 | * | 12/2007 | Best et al. ............... 379/88.19 |
| 7,369,260 | B2 | * | 5/2008  | Buschi et al. ............ 358/1.15 |
| 7,424,513 | B2 | * | 9/2008  | Winjum et al. ........... 709/205 |
| 2001/0054073 | A1 |  | 12/2001 | Ruppert et al. |
| 2001/0055073 | A1 |  | 12/2001 | Shinomiya |
| 2002/0077846 | A1 | * | 6/2002  | Bierbrauer et al. ........... 705/1 |
| 2003/0182331 | A1 |  | 9/2003  | Demsky et al. |
| 2004/0068545 | A1 | * | 4/2004  | Daniell et al. ............. 709/206 |
| 2005/0021648 | A1 | * | 1/2005  | Ogasawara et al. ........ 709/206 |
| 2005/0052692 | A1 |  | 3/2005  | Buschi et al. |

* cited by examiner

*Primary Examiner*—Thu Ha T Nguyen
(74) *Attorney, Agent, or Firm*—Schmeiser, Olsen & Watts; William H. Steinberg

(57) ABSTRACT

A method and system for processing a communication comprising a file attached to an electronic document, the communication having been transmitted from a first link to a second link of a chain of links. The method is performed by a data processing system at the second link. The file is selected and an existing filename of the selected file is determined. The existing filename has a generic filename component denoted as Filename.ext that does not relate to any characteristic of any link in the chain. Referential data is selected from at least one field of the document, encoded according to an encoding rule and at least one lexicographic rule, and merged with Filename.ext to generate a new filename. The referential data includes at least one characteristic of the first link. The file is renamed with the new filename, detached from the document, and stored in the data processing system.

27 Claims, 7 Drawing Sheets

| Lewis-Carroll@ibm.com | To: jfriday76@yahoo.com |
| --- | --- |
| | cc: |
| 02/09/2003 18:33 | Subject: Le Duc de Berry |

300

John:

The "Très Riches Heures du Duc de Berry" is usually referred to as "le roi des manuscrits enluminés" or "the king of the illuminated manuscripts", but it is also a pinnacle in the entire history of painting.

This was a collection of the text for each liturgical hour of the day – hence the name – which often included other, supplementary, texts. Calendars, prayers, psalms and masses for certain holy days were commonly included. Commissioned by Jean, Duc de Berry in 1413, it was painted by the Limbourg brothers who left it unfinished at their (and the Duc's) death in 1416. The Duc Charles I de Savoie commissioned Jean Colombe to complete the painting of the manuscript between 1485-1489.

I attach here a sample of the calendar paintings.

---
**** Attachment
Berry-January (mark@gide.uchicago.edu 02.09.2003 18.33 "Le Duc de Berry").gif has been removed from this note on February 10, 2004 by John Friday **** 

---

301

Best regards,
Lewis Carroll

FIG. 3

| Name | Size | Type | Modified |
|---|---|---|---|
| 1063606940.html | 71 KB | HTML Document | 15/09/2003 |
| ABCDEFGHIJKLM... | 42 KB | HTML Document | 15/09/2003 |
| barrowr.gif | 0 KB | GIF Image | 18/09/2003 |
| Berry(http..((www... | 111 KB | Microsoft Word Doc... | 18/06/2003 |
| cliff100.jpg | 32 KB | JPEG Image | 20/09/2003 |
| cliff101.jpg | 32 KB | JPEG Image | 20/09/2003 |
| ejemplos-de-pate... | 69 KB | Lotus Word Pro 9 D... | 29/01/2003 |
| fincert0.lwp | 1.303 KB | Lotus Word Pro 9 D... | 01/06/1999 |
| fincert1.lwp | 360 KB | Lotus Word Pro 9 D... | 15/03/2001 |
| FINCERT2.lwp | | | 2/07/2001 |
| fincert3.lwp | | | 2/10/2003 |
| fincert4.lwp | | | 4/05/2001 |
| IbmSpainProfileFo... | | | 2/07/2003 |
| IEEE-AC27-N4.pdf | | | 9/01/2003 |
| IEEE-AC2B-N2.pdf | | | 9/01/2003 |

File: Berry-January.gif
Received from Lewis-Carroll@ibm.com
On 02/09/2003 18:33

Berry-January (Lewis-Carroll@ibm.com 02.09.2003 18.33).gif

FIG. 4

METHOD AND SYSTEM FOR PROCESSING A FILE ATTACHED TO AN ELECTRONIC DOCUMENT

BACKGROUND OF THE INVENTION

1. Technical Field

The present invention relates generally to the field of electronic documents processing, to the manipulation of files attached to electronic documents, and more particularly, to systems and methods for tracing files detached from electronic documents.

2. Related Art

There are many software applications capable of attaching copies of files to electronic documents. Examples of such software systems include, but are not limited to, electronic mail systems, database systems and Web browsers. Collaborative systems, such as Lotus Notes (Lotus Notes® and IBM are trademarks of International Business Machines Corporation in certain countries), support the inclusion of files as e-mail attachments as well as attachments on documents stored in Lotus Notes® databases. By means of a browser, such as Internet Explorer from Microsoft Corporation (Microsoft® is a trademark of Microsoft Corporation in certain countries), a user can detach (or download) a copy of a document from a Web page on the Internet to the user's system local storage.

It is noted that attachments can be of any type of data such as images, graphic or text documents, spread sheets, mp3 files or programs. For instance, most of electronic-mail systems support RFC 822 (from Internet Engineering Task Force Request For Comments) which describes the STANDARD FOR THE FORMAT OF ARPA INTERNET TEXT MESSAGES that is a part of the Simple Mail Transfer Protocol (SMTP), e-mail standard protocol. This standard specifies a syntax for text messages that are sent among computer users, within the framework of "electronic mail". This standard has been completed by RFC 1521-MIME (Multipurpose Internet Mail Extensions) Part One: Mechanisms for Specifying and Describing the Format of Internet Message Bodies. MIME allows messages to incorporate non-text content (e.g., any type of file attachments) while still remaining compliant with RFC 822.

Using the preceding software, users accessing a file attached to an electronic document can detach the file to a local system for further processing. For example, on Lotus Notes a file attached to a document stored on a Lotus Notes® or Domino® database (Domino® is a trademark of IBM Corporation in certain countries), or attached to a note or memo on the Lotus Notes® mail Inbox, can be either viewed with a file viewer, launched or processed by another application, or detached from the electronic document and stored to be later on locally processed or executed, if the detached file is a program.

As a common practice, to save data storage space on server and client systems, file attachments are not kept permanently attached to the electronic documents. Instead, they are usually detached, and local copies of attached files are created.

To detach a file from an electronic document and create a local copy of the attached file, the user typically (as in Lotus Notes®), highlights the file to be detached, selects a "detach" option, and interacts with a "file save" interface to specify a filename for the local copy of the attached file and the location (i.e., the folder) to which the file is to be detached. On those conventional systems, when a file has been detached or removed from an electronic document, the file icon is replaced by a textual reference to the detached or removed file, and to the date and the author of this operation, like by example:

\*\*\*\* Attachment Berry-January.gif has been removedfrom this note on Feb. 10, 2004 by John Friday \*\*\*\*

This way to detach files has the advantage of automatically creating and keeping a trace in the electronic document of the file which has been detached or removed from it. This answers a general problem of automatically keeping a trace of a link between an electronic document and a file which has been detached from it.

A different approach is exemplified by a utility named "Detach Remove and Link" described on the IBM's developerWorks site, on:

http://www-10.lotus.com/ldd/sandbox.nsf/0/ fe7542cd3b120e1b00256c38004a6a27?OpenDocument This is basically a LotusScript® agent applied to save space in mail databases by allowing the user to detach attachments, insert a link to the detached file, and then remove the attachment(s) from a document.

However, these solutions only solve partially the problem of automatically keeping a trace of a link between an electronic document and a file which has been detached from it. As a matter of fact, if the source mail from which a file has been detached is removed from a mail log, the file name or the link is lost and the link between the detached file and its source document cannot be recovered. The posed problem is thus: How to identify that a given file stored on a user's storage, has been obtained by detaching it from a particular mail, or from a particular electronic document in a database, or from a Web page accessed by a browser, even when the source document has been removed from the system ?.

If the user has decided to create a repository of files detached from e-mails on a personal computing system, in the course of one year, hundreds of files may have been typically received by a user, these files having been received as attachments of e-mails from many different senders. Those files are usually detached by the user, and stored on folders, from where occasionally, they may be accessed by the user, reviewed and attached to new documents, or to outgoing e-mail, being redistributed to many people. At any moment, the user needs to identify the sources of those detached files (e.g., to ask the sender for further or related information, or for updated versions), even when the source e-mails from which those files were detached would be deleted, or lost.

SUMMARY OF THE INVENTION

The present invention provides a method for processing a communication sequentially transmitted across a chain of links, each link in the chain of links comprising at least one characteristic selected from the group consisting of an identifier of said each link, an identifier of a sender of the communication at said each link, and a date on which the communication was sent from said each link, and combinations thereof, said method being implemented by execution of program code instructions on a data processing system at a second link in the chain for the communication directly received at the second link from a first link in the chain, said communication comprising an electronic document with an attached file, said method comprising:

selecting the file from the communication;

determining an existing filename of the selected file, said existing filename comprising a generic filename component denoted as Filename.ext that does not relate to the at least one characteristic of any link in the chain;

identifying from an encoding rule at least one field in the document;

selecting referential data from the at least one field in accordance with the encoding rule, said referential data including a subset of the at least one characteristic of the first link;

generating a new filename for the selected file by encoding the selected referential data and merging the encoded referential data with Filename.ext in accordance with the encoding rule and in accordance with at least one lexicographic rule of a file manager of the data processing system;

renaming the selected file with the new filename, said new filename comprising Filename.ext;

detaching the selected file from the document; and storing the detached file on a first storage of the data processing system, said stored file on the first storage having the new filename.

The present invention provides a computer program product, comprising computer readable program code instructions that when executed implement a method for processing a communication sequentially transmitted across a chain of links, each link in the chain of links comprising at least one characteristic selected from the group consisting of an identifier of said each link, an identifier of a sender of the communication at said each link, and a date on which the communication was sent from said each link, and combinations thereof, said method being implemented by execution of program code instructions on a data processing system at a second link in the chain for the communication directly received at the second link from a first link in the chain, said communication comprising an electronic document with an attached file, said method comprising:

selecting the file from the communication;

determining an existing filename of the selected file, said existing filename comprising a generic filename component denoted as Filename.ext that does not relate to the at least one characteristic of any link in the chain;

identifying from an encoding rule at least one field in the document;

selecting referential data from the at least one field in accordance with the encoding rule, said referential data including a subset of the at least one characteristic of the first link;

generating a new filename for the selected file by encoding the selected referential data and merging the encoded referential data with Filename.ext in accordance with the encoding rule and in accordance with at least one lexicographic rule of a file manager of the data processing system;

renaming the selected file with the new filename, said new filename comprising Filename.ext;

detaching the selected file from the document; and storing the detached file on a first storage of the data processing system, said stored file on the first storage having the new filename.

The present invention provides a data processing system comprising a processor and a computer program product containing programming code instructions that when executed by the processor implement a method for processing a communication sequentially transmitted across a chain of links, each link in the chain of links comprising at least one characteristic selected from the group consisting of an identifier of said each link, an identifier of a sender of the communication at said each link, and a date on which the communication was sent from said each link, and combinations thereof, said method being implemented by execution of program code instructions on a data processing system at a second link in the chain for the communication directly received at the second link from a first link in the chain, said communication comprising an electronic document with an attached file, said method comprising:

selecting the file from the communication;

determining an existing filename of the selected file, said existing filename comprising a generic filename component denoted as Filename.ext that does not relate to the at least one characteristic of any link in the chain;

identifying from an encoding rule at least one field in the document;

selecting referential data from the at least one field in accordance with the encoding rule, said referential data including a subset of the at least one characteristic of the first link;

generating a new filename for the selected file by encoding the selected referential data and merging the encoded referential data with Filename.ext in accordance with the encoding rule and in accordance with at least one lexicographic rule of a file manager of the data processing system;

renaming the selected file with the new filename, said new filename comprising Filename. ext;

detaching the selected file from the document; and storing the detached file on a first storage of the data processing system, said stored file on the first storage having the new filename.

BRIEF DESCRIPTION OF THE DRAWINGS

FIG. 3 shows the content of an e-mail, as stored in an e-mail log, from which a file attachment has been detached, according to the prior art.

FIG. 4 illustrates a screen interface of a file viewer when a user wants to create a new e-mail with an attachment file having been previously detached, according to the present invention.

DETAILED DESCRIPTION OF THE INVENTION

Figure 1:
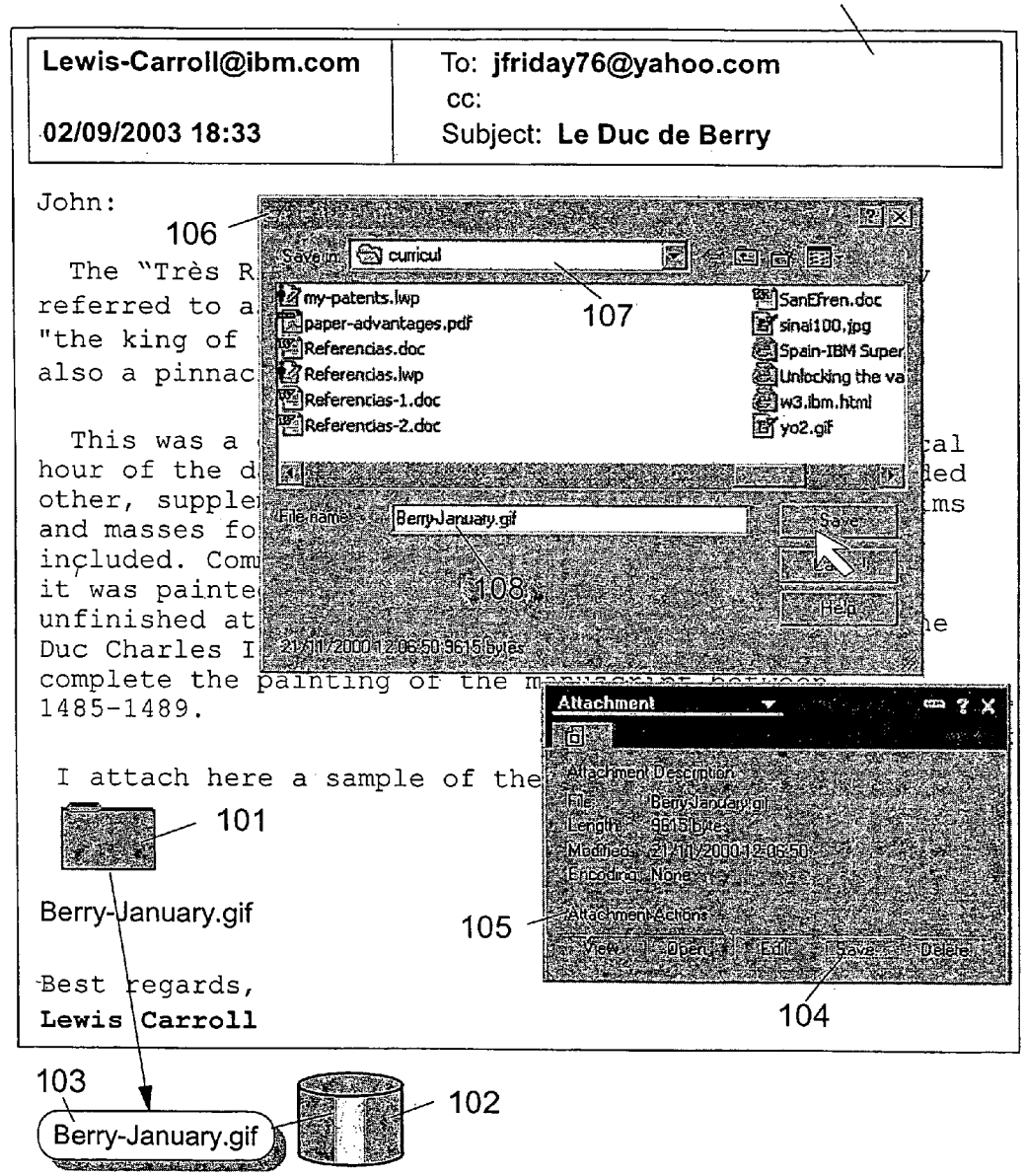
FIG. 1 illustrates screen interfaces between a user and an e-mail system commonly used for detaching a file attachment, according to the prior art.

The present invention provides a method for detaching attachment files from electronic documents while being able to retrieve from the detached file references about the source electronic documents. The detachment process of the present invention may be automatic.

The present invention provides a method for detaching a file attached to an electronic document through an application in which files can be detached from source electronic documents using the services of a file manager of the operating system of the computer on which the method is executed, said method comprising the steps of:

reading in a selected source electronic document the filename of a selected attached file;

reading in the electronic document at least one predefined type of information; characterizing the source electronic document, so called the referential information;

encoding the referential information using at least one predefined encoding rule and at least one lexicographic rule of the file manager, to form a new filename;

detaching the attached file on a storage location; and renaming the detached file with the new filename.

The method of the present invention may further comprise the steps of:

reading a filename of a selected file having been detached according to the previous steps;

parsing the filename using the at least one predefined encoding rule and the at least one lexicographic rule of the file manager;

decoding from the parsed filename, the referential information characterizing the source electronic document from which the selected file had been detached.

In addition, the selection of file to be detached or which has been detached may be performed upon reception of an interactive user request through a user interface, and the method may further comprising the step of displaying the referential information on a screen of the computer.

The method of the present invention may further comprise a step of creating an e-mail containing the decoded referential information and, optionally attaching to the e-mail the selected file which had been detached.

The application managing the electronic documents may be a Web browser and the electronic document may be a Web page. The application managing the electronic documents may be an e-mail system and the electronic document may be an e-mail.

The method of the present invention may be achieved with a computer program product comprising programming code instructions for executing the steps of the method when a program comprising the programming code is executed on a computer or a data processing system. The method of the present invention may be achieved with a data processing system comprising means adapted for carrying out the method.

Using the solution of the present invention in an e-mail system, if a file comes from an e-mail from which the file has been detached, the file name can include at least one reference to the source mail (e.g., the e-mail sender), the mailing date, the mail-id, the e-mail subject, etc. If the detached file comes from a database, the file name can include references to selected fields of the source electronic document (e.g., the database name and address), the document's name, the administrator name, the document's author etc. If the file has been detached from a web page, the file name can include references to the source Web page name, creation date, page URL, etc.

The referential information about the source of the detached file may be automatically created and kept with the detached file itself, and retrieved even when the source electronic document cannot be retrieved.

Furthermore, by means of the detached file naming assignment, having the referential information encoded as a part of its filename, making a search about an author's name, a reception date, or a URL, allows the user to identify and retrieve the previously detached files stored on the system responding to these search criteria.

Conversely, in the e-mail system, the database system, the browser or the file viewer of the operating system, the referential data: may be used to create the filename of the detached file; and may be automatically parsed, decoded and displayed to the user for further use. For example, in an e-mail system on which a file has been detached according to the invention, even when the source e-mail from which the file was detached is removed, the recipient user can identify the sender of this file and thus, the recipient user can prepare a new e-mail to the identified sender of the detached file, asking for further or related information on the subject, optionally attaching as a reference to this new e-mail the original detached. In one embodiment, a new pre formatted e-mail containing the file attachment may be automatically prepared and provided to the user for further processing such as editing and sending.

The invention may be implemented: as an extension of the operating system file manager; using standard services of the operating system file manager; or as an extension of an e-mail system, a database system, or a web browser.

The present invention may be implemented in software applications capable of attaching copies of files to electronic documents. Examples of such software systems include, but are not limited to, electronic mail systems, database systems, and web browsers. A collaborative system, such as Lotus Notes® supports both e-mail attachments and attachments in the documents stored in Lotus Notes® databases. In the following description, the example of implementation is in an e-mail system. The person skilled in the art can easily adapt the present invention to other systems such as database systems or browsers.

FIG. 1 illustrates the manual process according to the prior art by means of which a user, interacting with an e-mail system, detaches a file attachment from a source e-mail. In the example shown in FIG. 1, an e-mail (100) sent by a sender (Lewis) to a recipient (John), includes a file attachment (101) (e.g., picture file Berry-January.gif). To detach file (101) the user clicks on the attachment file icon (101) and then invokes the option "Save" (104) from a set of "Attachment Actions" (105). By invoking the "Save" action, a "Save Attachment" form (106) is displayed, enabling the user to select the folder (107) where the file must be saved on local storage (102), and enabling also the user to specify the name (108) under which the detached file (103) must be saved. By default (i.e., if the user do not specifies a different file name (108)), the detached file (103) will be saved with the name of the received file attachment (101).

Figure 2:
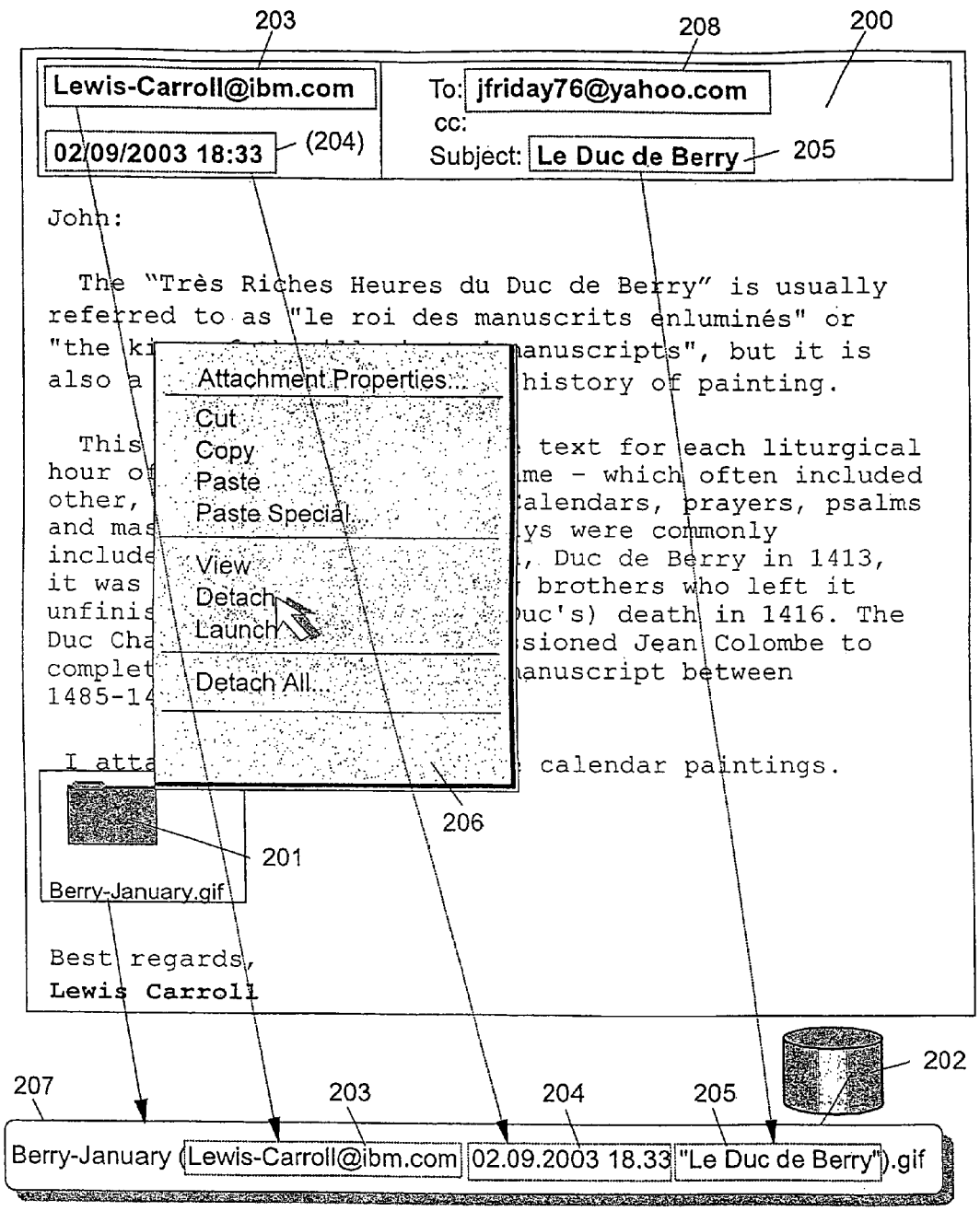
FIG. 2 illustrates a method for detaching an attachment file from an electronic document, according to the present invention.

FIG. 2 illustrates a method for detaching an attachment file from an electronic document, according to the present invention. The file name (207) of a file (201) detached from a document (e.g., an e-mail (200)) is used to encode an identification (e.g., the e-mail ID, the URL, etc.) of the electronic document, the address of the electronic document from which the file has been detached, any data (203), (204), (205) related with the originator or the author of said electronic document (e.g., the sender e-mail address, the sender name and phone number, the e-mail subject, date/time), or other relevant identification data, extracted from the received document (200), that would be useful to identify the source or subject of said file.

There are different types of file systems available for different operating systems. Each file system type has its own format and set of characteristics (such as filename length, maximum file size, etc.). For example, on Linux the most commonly used file system type is the Second Extended Filesystem, or ext2fs; it allows filenames up to 256 characters. On Windows, the VFAT (Win95) and FAT32 (Win98) file system's maximum length of filenames is 255 characters. On NTFS (New Technology File System, a file system used by the Windows NT operating system, also supported by Windows XP) and on the UNIX® (UNIX® is a registered trademark of The Open Group) file systems, the maximum length of filenames is 256 characters. Maximum available filename lengths of most modern file systems make it possible to encode data on the filename of a file in accordance with specific lexicographic rules imposed by the operating system.

Accordingly with the present invention, a lexicography may be determined so as to avoid encoding on the filename of a detached file, particular characters that may be forbidden by the file system (e.g., "\" or ":" characters on the Microsoft Windows operating system).

FIG. 2 discloses how, according to the present invention, the recipient (208) of an e-mail (200) detaches a file (201) to permanent storage (202) (e.g., to a folder on the local disk storage). Using conventional tools (206) of the e-mail system (as in the case of Lotus Notes®), an attached file (201) is detached to the folder specified by the user (e.g., on local disk storage (202)). Using a set of predefined rules, data fields of the e-mail (200) from which the file is detached, such as (203) (e.g., sender e-mail address), (204) (e.g., e-mail date and time), or (205) (e.g., e-mail subject), are copied with separators (e.g., space characters) to form a referential string of data fields identifying the source e-mail from which the file has been detached. Using a particular lexicography (where the used lexicography is determined so as to avoid particular characters that may be forbidden by the file system, e.g., "/" with Microsoft Windows system), the detached file is renamed by including, on the new filename (207), the referential data extracted from the e-mail.

In the example shown in FIG. 2, if the user selects to encode on the filename (207) of the detached file, the e-mail address of the sender (203), ("Lewis-Carroll@ibm.com"), the e-mail date and time (204), ("02/09/2003 18:33"), and the e-mail subject (205), ("Le Duc de Berry"), the detached file (201) ("Berry-January.gif") is saved and renamed as:

"Berry-January (Lewis-Carrol@ibm.com 02.09.2003 18.33 "Le Duc de Berry").gif".

In this illustrative example, the e-mail referential data is encoded and is appended to the original filename enclosed by parenthesis. For a person skilled on the art, other different forms of encoding referential data on a filename may be possible.

Also, as it can be easily appreciated by skilled people in the art, different embodiments of the present invention prevent the resulting encoded filename from exceeding the maximum length allowed (e.g., 255 characters). For example, a file detached from an e-mail can be automatically renamed by the e-mail system appending to the original filename predefined referential data of the received e-mail, such as (203) (e.g., the sender e-mail address), (204) (e.g., the e-mail date and time), and (205) (e.g., the e-mail subject), copied with separators (e.g., space characters) to form a referential string of data fields identifying the original e-mail, enclosed between parenthesis. When the (encoded detached) file is attached by the user to an e-mail, the encoded detached file (that is attached by the user) can be automatically renamed by the e-mail system, by discarding from the file name the encoded referential data (as in the example illustrated in FIG. 5).

In this embodiment, referential data (e.g., the sender, subject, date and time) of the e-mail from which a file is detached is encoded on the filename of the detached file. Applying this method to a chain of e-mails, where users reference on detached files the e-mail address of the sender (user-1 ----> user-2 ----> user-3 ---...----> user-N):

(1) user-1 attaches Filename.ext to an e-mail sent to user-2;
(2) user-2 receives Filename.ext attached to the e-mail sent by user-1 and saves the file renamed as Filename (e-mail-user-1).ext;
(3) when user-2 attaches this file to an e-mail to be sent to user-3 then: (i) Filename (e-mail-user-1).ext is temporally copied to Filename.ext on user-2 workstation, (ii) Filename.ext is attached to the e-mail, (iii) the e-mail is sent to user-3, and (iv) temporary file Filename.ext is erased from user-2 workstation;
(4) user-3 receives Filename.ext attached to the e-mail sent by user-2 and saves the file renamed as Filename (e-mail-user-2).ext;
(5) when user-3 attaches this file to an e-mail to be sent to user-4: (i) Filename (e-mail-user-2).ext is temporally copied to Filename.ext on user-3 workstation, (ii) Filename.ext is attached to the e-mail; (iii) the e-mail is sent to user-4, and (iii) temporary file Filename.ext is erased from user-3 workstation.

In one embodiment, on a chain of transmitted e-mails, all users may keep referential data of the originator (i.e., the first sender) of the file. In this embodiment, when a file is detached from an e-mail, if there is not referential data already encoded on the filename, then before saving the file, the file is renamed by encoding on the filename the e-mail address of the sender. However, if the e-mail address of the originator or sender is already encoded on the filename, then the detached file is saved without renaming the file.

Applying this method to a chain of e-mails, when a detached file (having encoded on the file name the e-mail address of the originator) is attached to new e-mail without modifying the file name (user-1 ----> user-2 ----> user-3 ---...---> user-N):

(1) user-1 (originator) attaches Filename.ext on an e-mail sent to user-2;
(2) user-2 receives Filename.ext attached to the e-mail sent by user-1 and saves it as Filename (e-mail-user-1).ext;
(3) when user-2 attaches this file to an e-mail to be sent to user-3, Filename (e-mail-user-1).ext is attached to the e-mail, and the e-mail is then sent to user-3;
(4) user-3 receives Filename (e-mail-user-1).ext attached to the e-mail sent from user-2 and saves the received file as Filename (e-mail-user-1).ext;
(5) when user-3 attaches this file to an e-mail to be sent to user-4: (i) Filename (e-mail-user-1).ext is attached to the e-mail, (ii) the e-mail is sent to user-4.

In one embodiment, it is possible to apply a rule comprising encoding two items on the filename of a received file, such as the e-mail address of the originator (i.e., the first sender in the chain of e-mails: e-mail-user-1), and the e-mail address of the sender, from which the file is received (i.e., the last sender in the chain of e-mails: e-mail-user-N): Filename (e-mail-user-1 e-mail-user-N).ext.

Using this rule, a recipient can trace the source of the file, by contacting the creator of the file, or contacting the sender from which the receipient has received the file, wherein the creator and the sender may be different. No information regarding intermediate recipients may be needed in some cases.

In the preceding embodiments, the term "link" may be used to designate each sender and/or receiver (e.g., user-1, user-2, eser-3, etc.) in the chain of e-mails. Thus, the present invention discloses sequentially transmitting a communication (i.e., an electronic document with an attached file) across a chain of links. Each link in the chain of links comprises at least one characteristic (e.g., an identifier of said each link, an identifier of a sender of the communication at said each link, and a date on which the communication was sent from said each link, and combinations thereof, etc., as described supra). Examples of links include e-mail links, database links, and a website links.

FIG. 3 shows how in the systems of the prior art such as Lotus Notes®, once a file has been detached from an e-mail (300), a textual reference (300) of the detach operation (i.e., which file has been detached, who has detached the file, in which date), or a link to the detached file, may replace the file icon (201) on the e-mail from which the file is detached. FIG. 3 also illustrates that, once a file (201) has been detached or removed from an e-mail (200), if the e-mail (300) (i.e., having the file detached) is erased or lost, the reference (or the link) (301) on the e-mail (300) to the detached file (103) or (207) will be lost. In this case, using methods for detaching files on the prior art, as illustrated by FIG. 1, the reverse reference from the detached file (103) to the sender of the e-mail (100) also will be lost. Consequently, the detached file (103) is orphan and it would be impossible in many cases for the user to know if the file was received as an e-mail attachment, or downloaded from a web site, or copied from a floppy-disk or by other means. Even in the case when the user remembers that the file was received on an e-mail, it would be impossible for the user to recall the name or the address of the sender, and to trace and get further information related with the file.

The present invention provides means for tracing from a file (207) saved on local disk, the sender address (203), the receipt date/time (204), and the subject (205) of the e-mail to which this file was attached. The present invention thus enables the recipient to communicate with the sender of the file in order to: get further related information, ask for a more recent version, or for any other purpose.

FIG. 4 illustrates the screen interface of a file viewer when the user executes the function of retrieving the referential data which were used for building the filename of an attachment file previously detached according to the present invention. A file (401) that has been detached from an e-mail (200), according with the present invention, is stored on the recipient's computer file system (400) with a filename that encodes data extracted from the filename from which the file was detached. These so called referential data may be the original filename (401), the sender e-mail address (402), and/or the date and time of said e-mail (403). This example shows how, when the user selects the file on the file viewer, the source e-mail data encoded on the selected file's filename is parsed, decoded, and displayed (404) to the user.

In this embodiment the function of retrieving referential data is embedded in a file viewer such as can be 'Windows Explorer'. The general method of retrieving referential data is described below in the document in reference to FIG. 7. As described infra in reference to FIG. 5, the function of retrieving referential data can be also embedded in the database system, the browser, or the e-mail systems.

Figure 5:
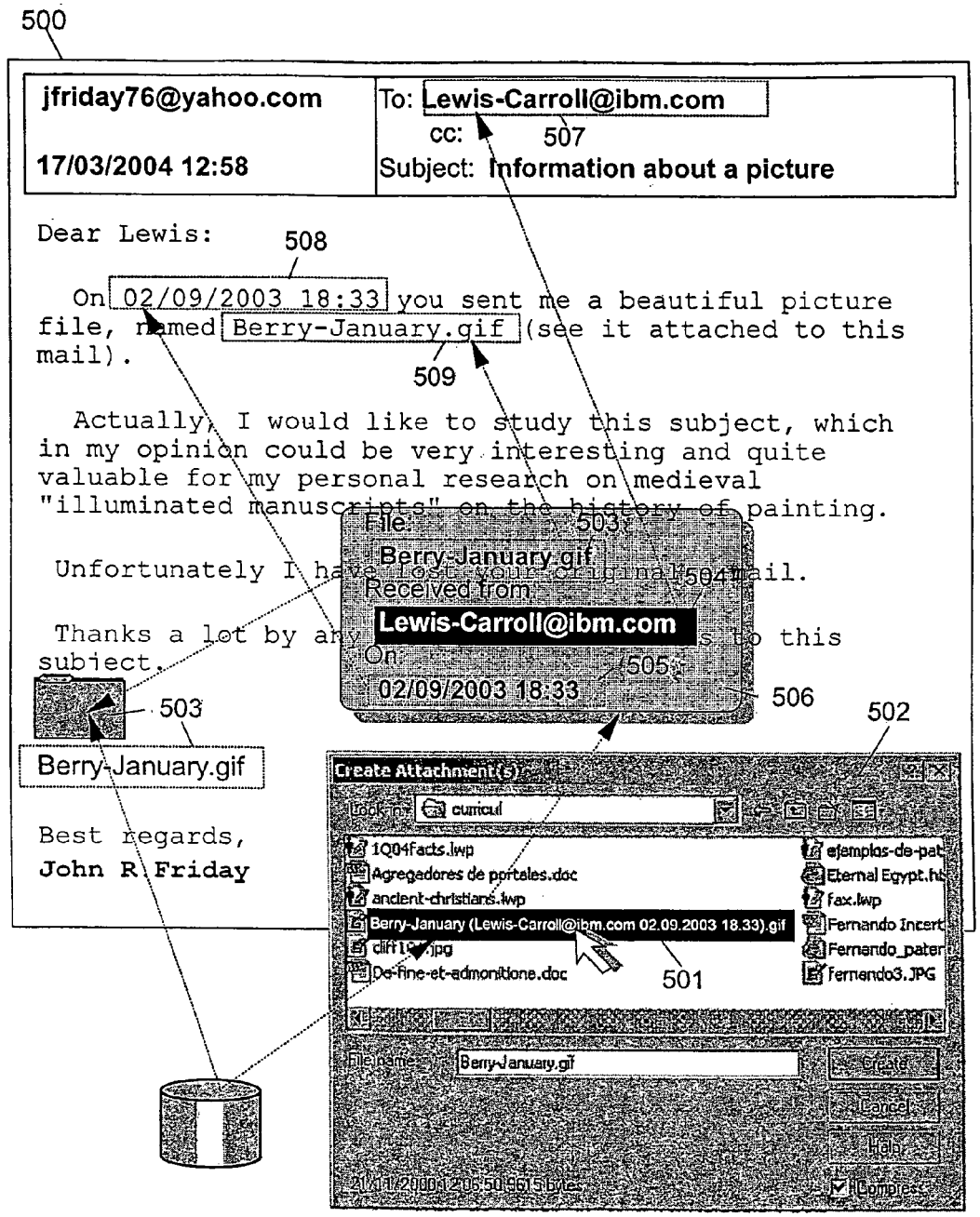
FIG. 5 illustrates the screen interface of an e-mail system when the user wants to create a new e-mail with an attachment file having been previously detached, according to the present invention.

FIG. 5 illustrates the screen interface of an e-mail system when the user wants to create a new e-mail with an attachment file having been previously detached according to the method of the present invention. By means of this invention, the user can create the e-mail with information retrieved from the filename of the previously detached file.

When the user wants to create a new e-mail in the e-mail system, the user activates the function 'new e-mail' and then, 'create an attachment'. A corresponding window (502) is opened and the user can click on the file the user would like to attach to the user's e-mail. This file was a file already detached from a previously received e-mail. This can be done even if the original e-mail (100) (from Lewis to John), from which the file was detached has been lost (e.g., deleted by the e-mail system or by the user). The information encoded on the filename (501) of the saved file (e.g., the e-mail address of the sender (504) (Lewis-Carroll@ibm.com) and the e-mail date/time (505) (02/09/2003 18:33)) can be used, and the recipient (John) recovers data of the source of this file. By identifying the sender, the date, the subject, or other related data, the user (John) can prepare and send an e-mail to the sender (Lewis), or to the originator, or both. There may be a need for creating a new e-mail asking for re-sending a file which was already detached, such as when the user would like to get a new version of the file, or request further information relating to the file's subject.

In one embodiment when the user, by means of an e-mail system (e.g., Lotus Notes®) desires to attach to an e-mail (500) a file (501) having a filename encoded according with the teachings of the present invention, by means of the "Create Attachment(s)" utility (502) data encoded on the file's filename, such as the original file name "Berry-January.gif" (503), the e-mail address of the sender "Lewis-Carroll@ibm.com" (504) and the e-mail date/time "02/09/2003 18:33" (505) is automatically parsed, decoded, and displayed to the user on a window (506). From the data on this window, the user can then select and copy data fields (e.g., the source e-mail address, source e-mail subject, original filename, source e-mail date and time) to selected fields (e.g., to the e-mail "To:" field (507) or to the text (508), (509) of the new e-mail. In the example of FIG. 5, the selected file is attached to the new e-mail renamed to the original filename it had when it was first received by the user.

Figure 6:
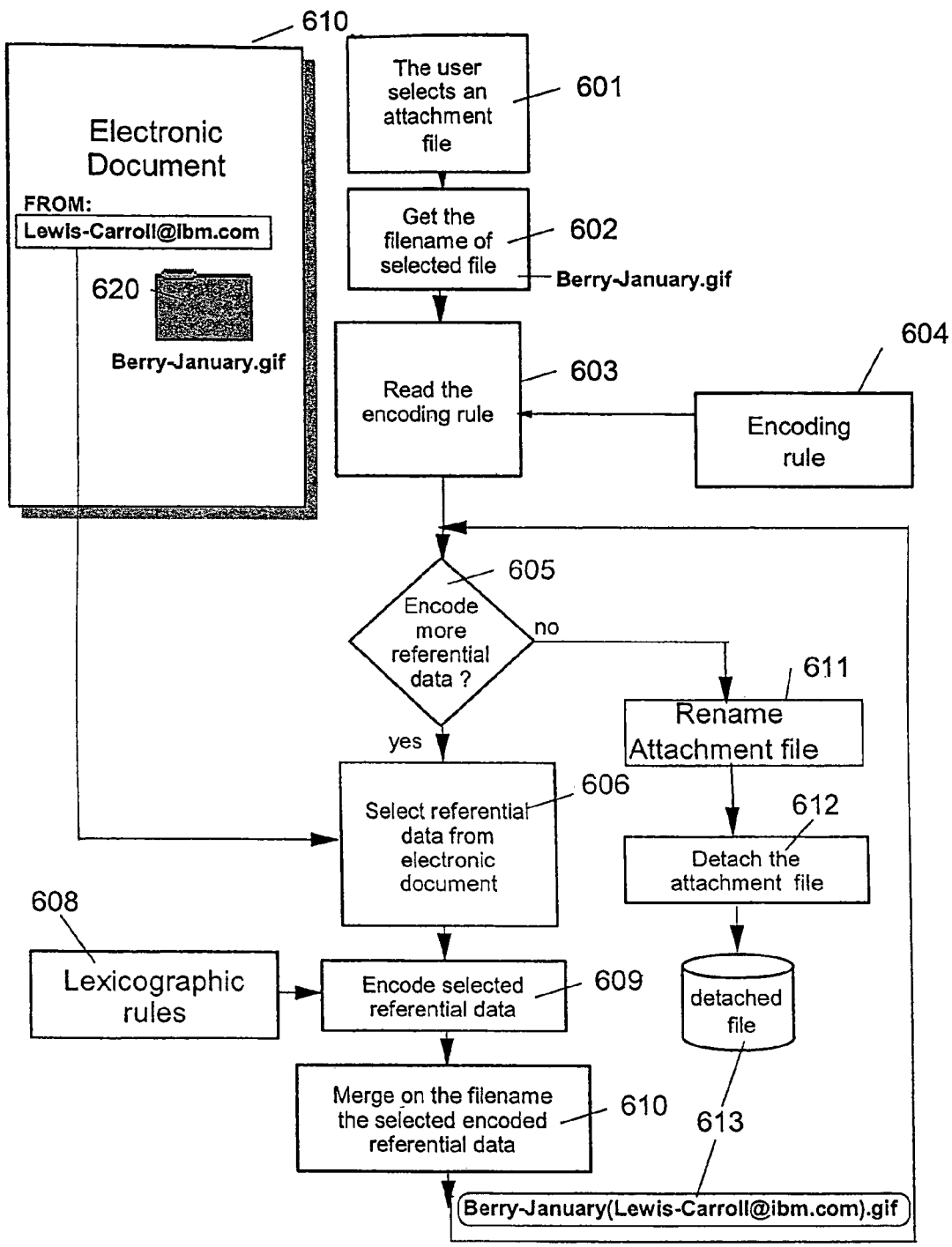
FIG. 6 is the general flow chart of a method for detaching a file from an electronic document, according to the present invention.

FIG. 6 is a flow chart of the method for detaching attachment files, according to the present invention. Step (601) selects an attachment file (620) in an electronic document (610) which contains referential data which are, if the electronic document is an e-mail, the address of the sender, (here, Lewis-Carrol@ibm.com) or other e-mail information such as the mail-id. Step (602) acquires the filename of the selected file. Step (602) is performed by using services of the file manager of the operating system or by reading the file name on the electronic document (here Berry-January.gif). Step (603) is for reading the encoding rule to be applied to detached files. The rule, stored in a file (604), can be changed according to the administrator or, can be changed upon an option of the user, wherein the rule is obtained interactively during the execution of this operation. Next step (605) is a test on referential data encoding according to the rule (604) read in the previous step (604). If all the referential data have not been yet encoded (answer "Yes" to test 605), the necessary referential data are successfully selected from the electronic document (606), encoded (609) according to the lexicographic rules (608) of the file manager and the encoding rule (604), and merged to build a file name (610). If there is no more referential data to be processed (answer "No" to test 605), the attachment file is renamed (e.g., Berry-January (Lewis-Carroll@ibm.com).gif)) (611), detached (612), and stored (613) in a local or remote storage accessible by the user.

This method may be executed by a system supporting file attachments in electronic documents, such as a client e-mail agent supporting MIME file attachments operating on a user workstation. For such a system, the steps of "User selects a file attachment" (601) and "Detach the attachment file" (612) may be already known. The user interface of the detachment function of such a system has no need to be changed. In the present invention, except for the step of 'User selects (601) a file attachment', all the other steps may be performed automatically on the user workstation. The steps of getting the filename of the attachment file and renaming the file use the services of the file manager. The step for encoding according to an encoding rule and lexicographic rules can be done in any of the different ways well known in the art.

The person skilled in the art knows how to adapt the e-mail system example to a web browser. The electronic documents are the web pages read by the browser and the referential data maybe the URL of a web object. The encoding rule (604) may be changed as well as the Lexicographic rule (608) which can be adapted to the file manager of the operating system.

Figure 7:
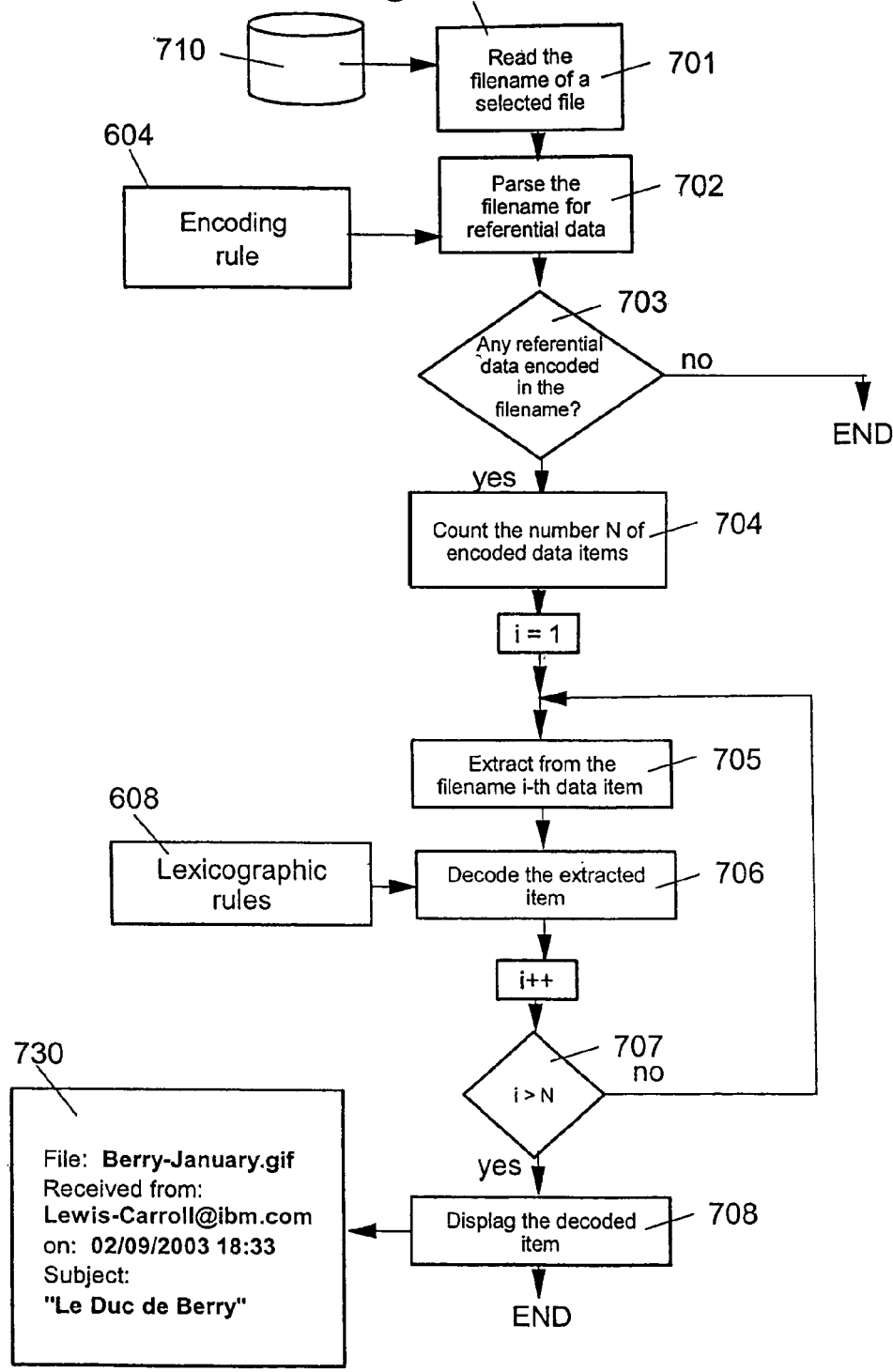
FIG. 7 is a flow chart of a method for parsing the file name of a detached file and displaying the corresponding referential data, according to the present invention.

FIG. 7 illustrates steps of the method for decoding and displaying the referential data, if any, associated to a file selected by a user, wherein this file has been previously detached according to the method of FIG. 6.

Step (701) reads a filename of a given file from a storage location (710). The filename is then parsed (702) according to the encoding rule (604). If no encoded referential data is found in the filename (answer "No" to test 703), then the process is ended. If encoded referential data have been found (answer "Yes" to test 703), the number of referential data item is identified (704) and a loop is executed for each identified encoded referential data item. The loop comprises a first step of extracting the encoded data (705), decoding (706) the extracted data according to the encoding rule (604), taking into account the Lexicographic rules (606), and incrementing the number of processed item. If all referential data items are not already processed (answer "No" to test 707), then the next item is processed. When all the items have been processed, then decoded items are displayed within a format (730) (i.e., specifying items names and values) corresponding to the items extracted from the initial reference. For example, when the filename contains encoded referential data of an e-mail having conveyed the attached file, the information of the original e-mail is displayed. The example (730) of FIG. 7 includes the original attachment filename, the sender, the date and subject of the e-mail. One extension could be a function for automatically building a new e-mail with the information read in the filename of a file clicked in a file list view, this file being itself attached to the new e-mail.

It is clear for skilled people that, even when, in the present invention the method for detaching files and retrieving their referential data is performed interactively through a user interface and upon request from the user, the same method can be implemented and executed through any kind of programming interface.

What is claimed is:

1. A method for processing a communication sequentially transmitted across a chain of links, each link in the chain of links comprising at least one characteristic selected from the group consisting of an identifier of said each link, an identifier of a sender of the communication at said each link, and a date on which the communication was sent from said each link, and combinations thereof, said method being implemented by execution of program code instructions on a data processing system at a second link in the chain for the communication directly received at the second link from a first link in the chain, said communication comprising an electronic document with an attached file, said method comprising:

selecting the file from the communication;
determining an existing filename of the selected file, said existing filename comprising a generic filename component denoted as Filename.ext that does not relate to the at least one characteristic of any link in the chain;
identifying from an encoding rule at least one field in the document;
selecting referential data from the at least one field in accordance with the encoding rule, said referential data including a subset of the at least one characteristic of the first link;
generating a new filename for the selected file by encoding the selected referential data and merging the encoded referential data with Filename.ext in accordance with the encoding rule and in accordance with at least one lexicographic rule of a file manager of the data processing system;
renaming the selected file with the new filename, said new filename comprising Filename.ext;
detaching the selected file from the document;
storing the detached file on a first storage of the data processing system, said stored file on the first storage having the new filename;
parsing the new filename in accordance with the encoding rule and in accordance with the at least one lexicographic rule to generate a parsed filename from the new filename;
decoding the referential data from the parsed filename; and
displaying the decoded referential data.

2. The method of claim 1, wherein the existing filename consists of Filename.ext.

3. The method of claim 1, wherein the existing filename is the new filename.

4. The method of claim 1, wherein the existing filename consists of Filename.ext merged with a subset of the at least one characteristic of a previous link in the chain, and wherein the communication had been directly or indirectly received at the first link from the previous link.

5. The method of claim 1, wherein the method further comprises:

generating a next filename comprising Filename.ext,
copying the file from the first storage to a second storage of the data processing system;
renaming the file in the second storage with the next filename;
sending to a third link in the chain the communication comprising the document and the renamed file in the second storage attached to the document.

6. The method of claim 5, wherein the existing filename consists of Filename.ext, and wherein the next filename consists of Filename.ext.

7. The method of claim 5, wherein the existing filename consists of Filename.ext, and wherein the next filename consists of the new filename.

8. The method of claim 5, wherein the existing filename consists of Filename.ext merged with an encoded first previous filename component and an encoded second previous filename component, wherein the first previous filename component includes a subset of the at least one characteristic of a first previous link in the chain, wherein the second previous filename component includes a subset of the at least one characteristic of a second previous link in the chain, wherein the communication had been directly or indirectly received at the second previous link from the first previous link, and wherein the communication had been directly received at the first link from the second previous link; and
wherein the next filename consists of Filename.ext merged with the encoded first previous filename component and the encoded referential data.

9. The method of claim 1, wherein each link in the chain is independently selected from the group consisting of an e-mail link, a database link, and a website link.

10. A computer program product, comprising computer readable program code instructions, embedded in a non-transitory computer storage medium, that when executed implement a method for processing a communication sequentially transmitted across a chain of links, each link in the chain of links comprising at least one characteristic selected from the group consisting of an identifier of said each link, identifier of a sender of the communication at said each link, and a date on which the communication was sent from said each link, and combinations thereof, said method being implemented by execution of program code instructions on a data processing system at a second link in the chain for the communication directly received at the second link from a first link in the chain, said communication comprising an electronic document with an attached file, said method comprising:

selecting the file from the communication;

determining an existing filename of the selected file, said existing filename comprising a generic filename component denoted as Filename.ext that does not relate to the at least one characteristic of any link in the chain;

identifying from an encoding rule at least one field in the document;

selecting referential data from the at least one field in accordance with the encoding rule, said referential data including a subset of the at least one characteristic of the first link;

generating a new filename for the selected file by encoding the selected referential data and merging the encoded referential data with Filename.ext in accordance with the encoding rule and in accordance with at least one lexicographic rule of a file manager of the data processing system;

renaming the selected file with the new filename, said new filename comprising Filename.ext;

detaching the selected file from the document;

storing the detached file on a first storage of the data processing system, said stored file on the first storage having the new filename;

parsing the new filename in accordance with the encoding rule and in accordance with the at least one lexicographic rule to generate a parsed filename from the new filename;

decoding the referential data from the parsed filename; and displaying the decoded referential.

11. The computer program product of claim 10, wherein the existing filename consists of Filename.ext.

12. The computer program product of claim 10, wherein the existing filename is the new filename.

13. The computer program product of claim 10, wherein the existing filename consists of Filename.ext merged with a subset of the at least one characteristic of a previous link in the chain, and wherein the communication had been directly or indirectly received at the first link from the previous link.

14. The computer program product of claim 10, wherein the method further comprises:

generating a next filename comprising Filename.ext, copying the file from the first storage to a second storage of the data processing system;

renaming the file in the second storage with the next filename;

sending to a third link in the chain the communication comprising the document and the renamed file in the second storage attached to the document.

15. The computer program product of claim 14, wherein the existing filename consists of Filename.ext, and wherein the next filename consists of Filename.ext.

16. The computer program product of claim 14, wherein the existing filename consists of Filename.ext, and wherein the next filename consists of the new filename.

17. The computer program product of claim 14, wherein the existing filename consists of Filename.ext merged with an encoded first previous filename component and an encoded second previous filename component, wherein the first previous filename component includes a subset of the at least one characteristic of a first previous link in the chain, wherein the second previous filename component includes a subset of the at least one characteristic of a second previous link in the chain, wherein the communication had been directly or indirectly received at the second previous link from the first previous link, and wherein the communication had been directly received at the first link from the second previous link; and wherein the next filename consists of Filename.ext merged with the encoded first previous filename component and the encoded referential data.

18. The computer program product of claim 10, wherein each link in the chain is independently selected from the group consisting of an e-mail link, a database link, and a website link.

19. A data processing system comprising a processor and a computer program product containing programming code instructions, embedded in a non-transitory computer storage medium, that when executed by the processor implement a method for processing a communication sequentially transmitted across a chain of links, each link in the chain of links comprising at least one characteristic selected from the group consisting of an identifier of said each link, an identifier of a sender of the communication at said each link and a date on which the communication was sent from said each link, and combinations thereof, said method being implemented by execution of program code instructions on a data processing system at a second link in the chain for the communication directly received at the second link from a first link in the chain, said communication comprising an electronic document with an attached file, said method comprising:

selecting the file from the communication;

determining an existing filename of the selected file, said existing filename comprising a generic filename component denoted as Filename.ext that does not relate to the at least one characteristic of any link in the chain;

identifying from an encoding rule at least one field in the document;

selecting referential data from the at least one field in accordance with the encoding rule, said referential data including a subset of the at least one characteristic of the first link;

generating a new filename for the selected file by encoding the selected referential data and merging the encoded referential data with Filename.ext in accordance with the encoding rule and in accordance with at least one lexicographic rule of a file manager of the data processing system;

renaming the selected file with the new filename, said new filename comprising Filename.ext;

detaching the selected file from the document;

storing the detached file on a first storage of the data processing system, said stored file on the first storage having the new filename;

parsing the new filename in accordance with the encoding rule and in accordance with the at least one lexicographic rule to generate a parsed filename from the new filename;

decoding the referential data from the parsed filename; and
displaying the decoded referential data.

20. The data processing system of claim 19, wherein the existing filename consists of Filename.ext.

21. The data processing system of claim 19, wherein the existing filename is the new filename.

22. The data processing system of claim 19, wherein the existing filename consists of Filename.ext merged with a subset of the at least one characteristic of a previous link in the chain, and wherein the communication had been directly or indirectly received at the first link from the previous link.

23. The data processing system of claim 19, wherein the method further comprises:
generating a next filename comprising Filename.ext,
copying the file from the first storage to a second storage of the data processing system;
renaming the file in the second storage with the next filename;
sending to a third link in the chain the communication comprising the document and the renamed file in the second storage attached to the document.

24. The data processing system of claim 23, wherein the existing filename consists of Filename.ext, and wherein the next filename consists of Filename.ext.

25. The data processing system of claim 23, wherein the existing filename consists of Filename.ext, and wherein the next filename consists of the new filename.

26. The data processing system of claim 23,
wherein the existing filename consists of Filename.ext merged with an encoded first previous filename component and an encoded second previous filename component, wherein the first previous filename component includes a subset of the at least one characteristic of a first previous link in the chain, wherein the second previous filename component includes a subset of the at least one characteristic of a second previous link in the chain, wherein the communication had been directly or indirectly received at the second previous link from the first previous link, and wherein the communication had been directly received at the first link from the second previous link; and
wherein the next filename consists of Filename.ext merged with the encoded first previous filename component and the encoded referential data.

27. The data processing system of claim 19, wherein each link in the chain is independently selected from the group consisting of an e-mail link, a database link, and a website link.

* * * * *